(12) United States Patent
Fuechtner et al.

(10) Patent No.: US 9,458,851 B2
(45) Date of Patent: Oct. 4, 2016

(54) ELECTRIC MACHINE FOR A HYBRID OR ELECTRIC VEHICLE

(71) Applicant: Dr. Ing. h.c. F. Porsche Aktiengesellschaft, Stuttgart (DE)

(72) Inventors: Martin Fuechtner, Stuttgart (DE); Harald Raiser, Balingen (DE)

(73) Assignee: DR. ING. H.C.F. PORSCHE AKTIENGESELLSCHAFT, Stuttgart (DE)

(*) Notice: Subject to any disclaimer, the term of this patent is extended or adjusted under 35 U.S.C. 154(b) by 337 days.

(21) Appl. No.: 13/940,563

(22) Filed: Jul. 12, 2013

(65) Prior Publication Data

US 2014/0030123 A1 Jan. 30, 2014

(30) Foreign Application Priority Data

Jul. 25, 2012 (DE) .................. 10 2012 106 740

(51) Int. Cl.
| | |
|---|---|
| *F04D 13/06* | (2006.01) |
| *H02K 21/22* | (2006.01) |
| *H02K 7/00* | (2006.01) |
| *H02K 7/108* | (2006.01) |

(Continued)

(52) U.S. Cl.
CPC ............... *F04D 13/06* (2013.01); *H02K 7/006* (2013.01); *H02K 7/108* (2013.01); *H02K 9/06* (2013.01); *H02K 9/08* (2013.01); *H02K 21/22* (2013.01); *Y02T 10/641* (2013.01)

(58) Field of Classification Search
CPC ................................. F04D 13/06; F16D 13/50
USPC .......................... 310/62, 63, 76, 78
See application file for complete search history.

(56) References Cited

U.S. PATENT DOCUMENTS

| 5,988,307 A | 11/1999 | Yamada et al. |
| 6,302,253 B1 * | 10/2001 | Link et al. ................ 192/55.61 |

(Continued)

FOREIGN PATENT DOCUMENTS

| CN | 101079565 | 11/2007 |
| CN | 201100944 | 8/2008 |

(Continued)

OTHER PUBLICATIONS

German Search Report of Jun. 17, 2013.

(Continued)

*Primary Examiner* — Devon Kramer
*Assistant Examiner* — Kenneth J Hansen
(74) *Attorney, Agent, or Firm* — Gerald E. Hespos; Michael J. Porco; Matthew T. Hespos

(57) ABSTRACT

An electric machine (1) for a hybrid or electric vehicle has an external rotor and a stator (2) within the rotor (3). The rotor (3) has a rotor carrier (4), rotor plates (5) and permanent magnets (6). The rotor carrier (4) has a first, radially extending carrier section (7) and a second axially extending carrier section (8). The second carrier section (8) bears the rotor plates (5) and permanent magnets (6). The stator (2) has stator plates (9) and wire windings (10) that form winding heads (11, 12) extending axially on both sides over the stator plates (9). An impeller wheel (14) is connected to the rotor carrier (4) and is between the winding heads (11) on an axial side of the stator (2), and the second carrier section (8). The electric machine provides high power in a small axial extent with optimum air cooling of the rotor and stator.

15 Claims, 4 Drawing Sheets

(51) Int. Cl.
*H02K 9/06* (2006.01)
*H02K 9/08* (2006.01)

(56) References Cited

U.S. PATENT DOCUMENTS

| | | | |
|---|---|---|---|
| 7,342,333 B2* | 3/2008 | Umezu | 310/67 R |
| 2002/0053838 A1* | 5/2002 | Okuda | 310/59 |
| 2010/0164307 A1 | 7/2010 | Kim et al. | |
| 2010/0200317 A1 | 8/2010 | Hornburg et al. | |

FOREIGN PATENT DOCUMENTS

| | | |
|---|---|---|
| DE | 2 058 729 | 6/1972 |
| DE | 42 06 360 | 9/1993 |
| DE | 42 30 529 | 3/1994 |
| DE | 43 10 493 | 10/1994 |
| DE | 101 54 353 | 5/2002 |
| DE | 10 2006 039 106 | 2/2008 |
| EP | 1555739 | 7/2005 |
| EP | 2048768 | 4/2009 |
| EP | 2332760 | 6/2011 |
| JP | S60212613 | 10/1985 |
| JP | S61124246 | 6/1986 |
| JP | H08191555 | 7/1996 |
| JP | H09-044275 | 2/1997 |
| JP | 2002010574 | 1/2002 |
| JP | 2002084728 | 3/2002 |

OTHER PUBLICATIONS

UK Search Report.
Chinese Patent Appl. No. 2013103114226—Office Action issued Jun. 4, 2015.
German Patent Appl. No. 10 2012 106 740.6—Search Report issued Jun. 10, 2015.

* cited by examiner

ELECTRIC MACHINE FOR A HYBRID OR ELECTRIC VEHICLE

CROSS REFERENCE TO RELATED APPLICATIONS

This application claims priority under 35 USC 119 to German Patent Appl. No. 10 2012 106 740.6 filed on Jul. 25, 2012, the entire disclosure of which is incorporated herein by reference.

BACKGROUND

1. Field of the Invention

The invention relates to an electric machine for a hybrid or electric vehicle. The electric machine has an external rotor and a stator arranged within a rotor. The rotor has a rotor carrier, rotor plates and permanent magnets. The rotor carrier has a first, radially extending carrier section and a second, axially extending carrier section connected thereto. The second carrier section bears the rotor plates and the permanent magnets. The stator has stator plates and wire windings. The wire windings form winding heads that extend axially on both sides over the stator plates. An impeller wheel is connected to the rotor carrier.

2. Description of the Related Art

DE 195 13 134 A1 discloses the above-described electric machine. The impeller wheel of the electric machine of DE 195 13 134 A1 is molded integrally and protrudes freely toward the outside into a floor of the rotor carrier which is configured in a beaker shape. Cooling air is sucked into the beaker-shaped rotor carrier and forced through the stator when the impeller wheel rotates, thereby ensuring sufficient cooling of the winding heads of the stator. The impeller wheel is arranged between the winding heads, which are arranged on an axial side of the stator, and a bell-shaped cover housing, which is fit over the rotor. The cover housing has an air inlet duct on the floor of the rotor carrier in the region of the impeller wheel and air outlet openings for the cooling air at an attachment end having an end plate.

The impeller wheel of this known electric machine is arranged axially next to the winding heads. Thus, the electric machine disadvantageously has a relatively large axial extent. In this context, additional axial installation space is required for the impeller wheel and therefore is not utilized for other components of the electric machine that are functionally absolutely necessary. Given a specific power level of the electric machine, a relatively large axial extent of the electric machine is therefore required.

The object of the invention is to provide an electric machine that has a high power level accompanied by a short axial extent and that has optimum air cooling in the region of the rotor and stator.

SUMMARY OF THE INVENTION

The invention relates to an electric machine where the impeller wheel is arranged between the winding heads, which are arranged on an axial side of the stator, and the second carrier section. The stator therefore comprises wire windings that are wound around the stator plates. The wire windings extend here, when viewed in the axial direction, beyond the stator plates on both sides and form the winding heads there. As a result, the rotor carrier first must be made to extend axially past the winding heads, which are arranged on this axial side of the stator. The rotor carrier, when viewed in the radial direction, is arranged in the region of the second carrier section and behind the rotor plates. Thus, an unused installation space is produced in the radial direction in the region of the rotor plates. The rotor carrier lies radially on the outside and must engage around these winding heads. This free installation space is utilized for mounting the impeller wheel. Since the rotor carrier is equipped with the impeller wheel, previously unutilized installation space can be used to improve the cooling of the electric machine.

Accordingly, the electric machine is optimized in terms of the tensioned dimensional chain in the longitudinal structure of the drive train of the hybrid or electric vehicle. The longitudinal structure, and therefore the axial extent of the electric machine, can be kept as short as possible with possible installation of maximum power. The increased power gives rise to increased cooling requirements. However, this cooling is brought about by the impeller wheel, which rotates with the rotor carrier.

The rotor carrier preferably is pot-shaped. More particularly, the first carrier section forms a floor region of the rotor carrier, and the second carrier section forms a circumferential wall region of the rotor carrier. Thus, the electric machine can be structurally simple. This configuration enables the electric machine to be connected to an internal combustion engine and to a transmission of the vehicle.

The impeller wheel preferably is arranged adjacent to the floor region of the rotor carrier. This positioning of the impeller wheel contributes to keeping the longitudinal structure as short as possible. In this regard it is advantageous that the impeller wheel is arranged adjacent to the laminated core and the permanent magnets. Accordingly, the impeller wheel advantageously is arranged immediately adjacent to the floor region of the rotor carrier and immediately adjacent to the laminated core and the permanent magnets.

The impeller wheel preferably has an axial extent that corresponds substantially to the axial excess dimension of the winding heads, on the axial side of the stator assigned to the impeller wheel, above the rotor plates and/or the permanent magnets. As a result, the impeller wheel takes up an axial space that is available in any case as a result of the axial excess dimension of the specified winding heads. The impeller wheel therefore does not require any additional axial installation space of the electric machine. Only that axial installation space of the electric machine that is absolutely necessary in any case for other components of the electric machine is utilized.

The impeller wheel acts as a radial blower and delivers an air flow that is either cooled by an open cooling system that feeds in relatively cold air via a feed duct, and relatively warm outgoing air is discharged via a window. Alternatively, a closed cooling system may be provided by circulating the air continuously within the closed-off electric machine of the impeller wheel or of the radial blower.

Incoming air of an open cooling system advantageously is fed in the axial direction into the region between the rotor and stator via feed ducts in a housing of the electric machine, and outgoing air is discharged through openings in the rotor carrier and the housing.

The rotor carrier and the impeller wheel preferably define a single cast part. As a result, the complex, costly impeller wheel geometry is manufactured by casting. The rest of the rotor carrier is processed in a material-cutting fashion.

The impeller wheel preferably has holes on the circumference and individual plastic air-blade-shaped elements are inserted into the holes and secured there in the impeller wheel. The air-blade-shaped elements may clipped in and/or secured radially, above all however also tangentially.

The impeller wheel also may have holes on the circumference. The holes are shaped by a shaping process to form air-blade-shaped elements.

An axial seal may be arranged between the housing and the rotor carrier. The axial seal between the housing and the rotor carrier guides the air in a targeted fashion to components to be cooled and avoids leakage for a highly efficient cooling air volume flow.

The rotor carrier preferably is connected to an axial receptacle for connecting to a transmission input shaft in a rotationally fixed fashion.

If the electric machine is used in conjunction with a hybrid vehicle, the electric machine preferably has an axially arranged intermediate shaft for connecting to a crankshaft of the internal combustion engine in a rotationally fixed fashion. In this context, the intermediate shaft is connected indirectly to the crankshaft.

The electric machine that is used in a hybrid vehicle may have a clutch for connecting the intermediate shaft and transmission input shaft in a rotationally fixed fashion when the clutch is closed. Therefore, if the clutch is opened, only the electric machine acts on the vehicle transmission. When the clutch is closed, the internal combustion engine acts on the vehicle transmission, or the electric machine and the internal combustion engine act thereon.

The electric machine may be mounted in such a way that the impeller wheel and/or the radial blower initially are introduced into the rotor carrier, and subsequently the rotor plates are added. The rotor carrier then is rolled or caulked at its axial end position lying opposite the impeller wheel or the radial blower. This rolling/caulking causes the impeller wheel and radial blower to be secured axially.

The radial securing of the impeller wheel and radial blower may be ensured by screws. The screws simultaneously function to screw a pressure plate of the clutch to the rotor of the electric machine, since the electric machine is inserted into the drive train of the motor vehicle.

The inventive arrangement of the impeller wheel ensures that a maximum air flow is guided between the rotor and the stator, in particular through the gap between the permanent magnets and the stator plates with the winding heads. This ensures optimum air cooling of these thermally loaded regions of the electric machine.

Further features of the invention emerge from the appended drawing and the description of the preferred exemplary embodiment represented in the drawing, without being limited thereto.

DETAILED DESCRIPTION OF THE PREFERRED EMBODIMENTS

Figure 1:
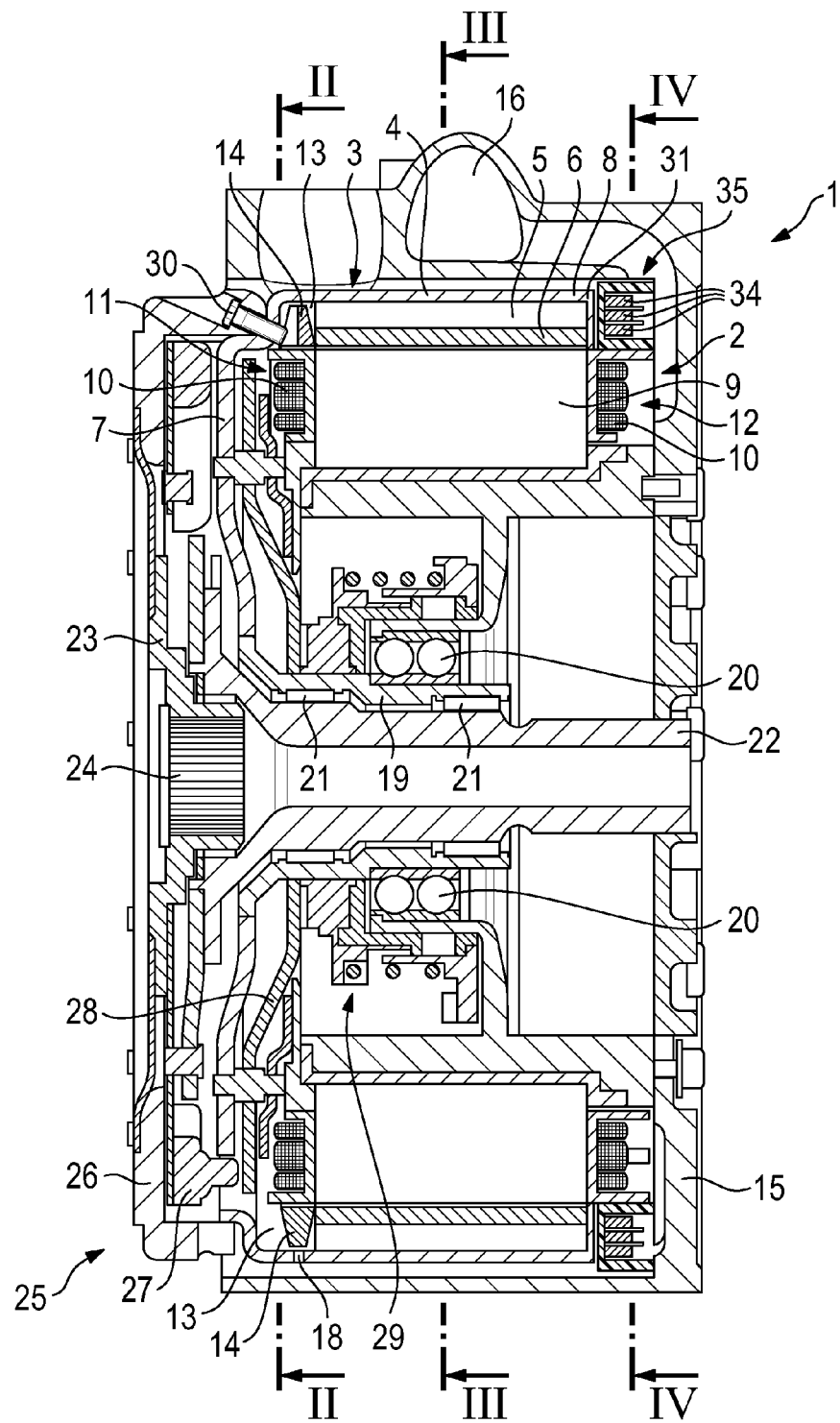
FIG. 1 is a vertical section through the electric machine according to the invention, in section in the axial direction of the electric machine.

The electric machine 1 illustrated in the figures is used in a hybrid vehicle, preferably a sports car, that has the electromotive drive by means of the electric machine and the drive by means of the internal combustion engine.

The electric machine 1 has a stator 2 arranged within a rotor 3. The rotor 3 has a rotor carrier 4, rotor plates 5 and permanent magnets 6. The rotor carrier 4 is formed by a first, radially extending carrier section 7 and a second, axially extending carrier section 8 connected thereto. The first carrier section 7 forms the floor of the rotor carrier 4, and the second carrier section 8 forms a circumferential wall of the rotor carrier 4. The rotor plates 5 and the permanent magnets 6 are carried by the second carrier section 8 and are arranged radially on the inside of the second carrier section 8. Specifically the rotor plates 5 are positioned outward of the permanent magnets 6. The rotor plates 5 and the permanent magnets 6 extend over the same axial length which is shorter than the axial length of the second carrier section 8.

The stator 2 has stator plates 9 and wire windings 10. The wire windings 10 form winding heads that project axially on both ends above the stator plates 9. The winding heads on the side of the first carrier section 7 are denoted by the reference number 11, and the winding heads of the side of the stator 2 facing away from this side are denoted by the reference number 12.

FIG. 1 shows that a dead space 13 exists between the radially outer region of the first carrier section 7, the rotor plates 5 and the permanent magnets 6. The dead space 13 is arranged concentrically with respect to the axis of the rotor 3 and is in an axial position between the stator plates 9 and the winding heads 11, and is in a region in the second carrier section 8 facing the first carrier section 7. An annular impeller wheel 14 is arranged in the dead space 13 and acts as a radial blower. The impeller wheel 14 is connected to the rotor carrier 4 in the region of the first carrier section 7. The impeller wheel 14 accordingly is arranged between the winding heads 11 and the second carrier section 8. Moreover, the impeller wheel 14 is connected to the first carrier section 7 at a short distance from the rotor plates 5 and permanent magnets 6. The rotor plates 5 and permanent magnets 6 extend over the same axial extent of the electric machine 1, and therefore end at the same axial position on the electric machine 1.

The stator 2 is mounted in a housing 15 of the electric machine 1 and is connected thereto. The housing 15 is provided in its upper region with a feed duct 16 for incoming air and for relatively cold air. This feed duct 16 divides in the housing 15 into a multiplicity of feed ducts 17 that open axially in the region of the winding heads 12 into the cavity in the electric machine 1 that is bounded by the stator 2 and the rotor 3, and specifically into the region of the circumferential axial gap between rotor plates 5/permanent magnets 6 and stator plates 9/winding heads 11. The air is sucked in through this gap via the impeller wheel 14, and therefore the radial blower, and is expelled by the impeller wheel 14 through radially extending passages 18 in the second carrier section 8 and passages in the housing 15 that are not illustrated. As a result, the air from the electric machine 1 can be conveyed through these passages in the rotor carrier 4 and the housing 15. This electric machine 1 therefore has an open cooling system.

As a result, relatively cold air is fed into the region between the stator 2 and the rotor 3 via the feed ducts 16 and 17, is heated up there by waste heat of the electric machine, and relatively warm outgoing air is carried out of the electric machine 1 through the passages 18 and the passages in the housing 15.

The rotor 3 has a cylinder section 19 connected to the first carrier section 7 and the rotor 3 is mounted rotatably in the housing 15 via the cylindrical section 19 by double ball bearings 20. The double ball bearings 20 are mounted radially on the outside in the housing 15 and take up the cylinder section 19 radially on the inside. The cylinder section 19 takes up needle bearings 21 radially on the inside, and an intermediate shaft 22 is mounted in the needle bearings 21. The intermediate shaft 22 connects indirectly to a crankshaft of the internal combustion engine. Therefore, during operation of the internal combustion engine, the crankshaft thereof drives the intermediate shaft 22. The input of this intermediate shaft 22 is on the side of the housing 15 assigned to the winding heads 12. A wheel 23 is connected to the rotor carrier 4 on the other side of the housing 15, and specifically on the side to which the winding heads 11 are assigned. The wheel 23 has a receptacle 24 for connecting to a transmission input shaft in a rotationally fixed fashion. The receptacle 24 has a notched toothing for the transmission input shaft which has a corresponding notched toothing at the end.

The rotor 3, intermediate shaft 22 and wheel 23 can rotate about the same central axis of the electric machine 1.

The side of the electric machine 1 facing the winding heads 11 also has a clutch 25. The clutch 25, when closed, brings about frictional engagement between the intermediate shaft 22 and the rotor 3, and therefore frictional engagement between the intermediate shaft 22 and the transmission-side receptacle 24 by virtue of the fixed connection between the rotor 3 and the receptacle 24. The clutch 25 has a pressure plate 26, a corresponding pressure plate 27, a disk spring 28 and a disengagement bearing 29, mounted in the housing 15 for the disk spring 18.

The pressure plate 26 of the clutch 25 is connected to the rotor carrier 4 by screws 30 penetrate drilled holes in the pressure plate 26 and are screwed into threaded holes in the rotor carrier 4 in the region of the first carrier section 7 adjacent to the second carrier section 8. The screws 30 in the region of the impeller wheel 14 function to secure the impeller wheel 13 radially. In this respect, the free ends of the screws 30 make contact with the impeller wheel 14 and position the impeller wheel 14 between the ends of the screws 30 and the permanent magnets 6 of the rotor 3.

The mounting of the electric machine 1 is provided so that the impeller wheel 14 initially is inserted into the rotor carrier 4. The rotor plates 5 then are added and then the rotor carrier 4 is rolled or caulked at its axial end position opposite the impeller wheel 14. This rolling/caulking secures the impeller wheel 4 axially. An end region 31 is generated by rolling or shaping and extends radially inward, as shown in FIG. 1.

Figure 2:
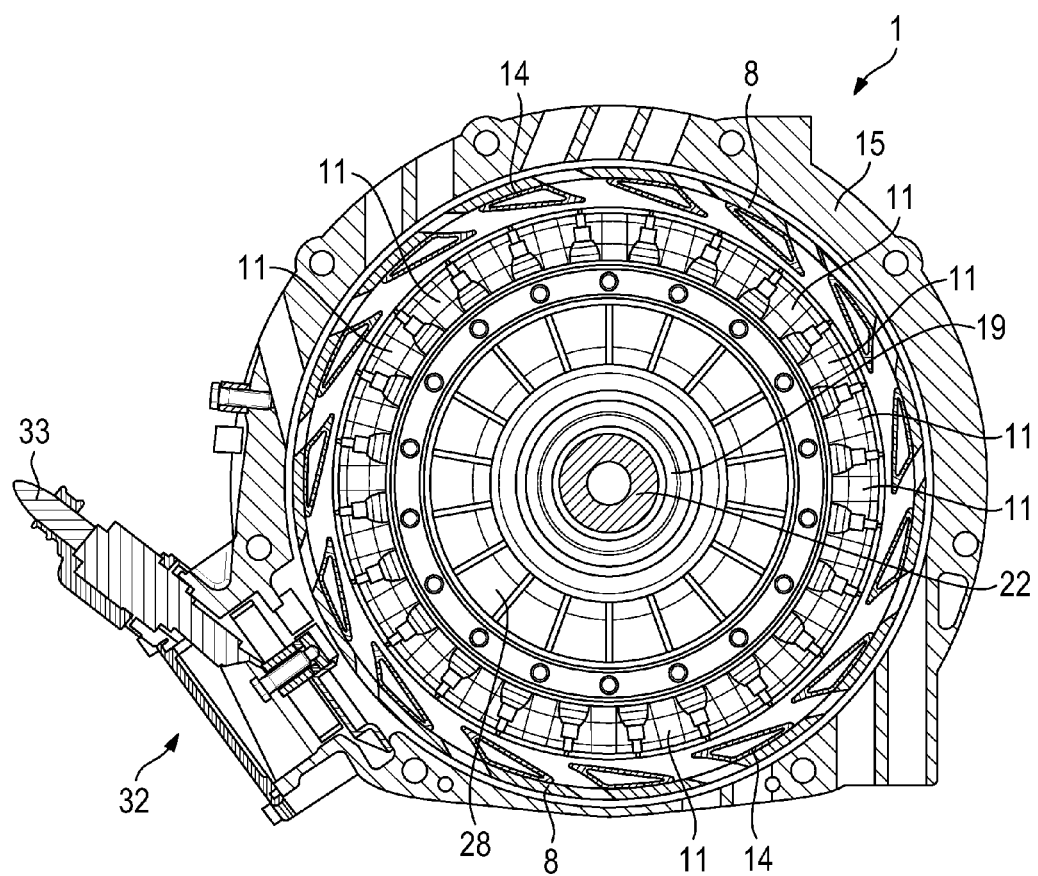
FIG. 2 is a section taken along line II-II in FIG. 1.
Figure 3:
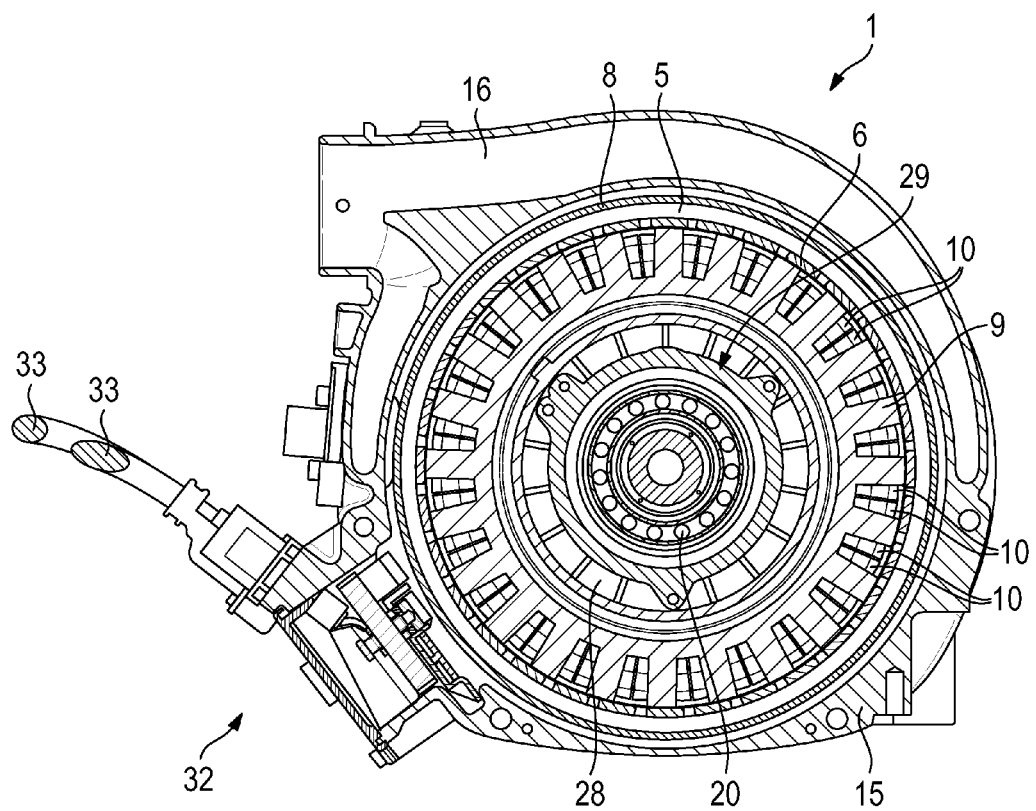
FIG. 3 is a section taken along line III-III in FIG. 1.
Figure 4:
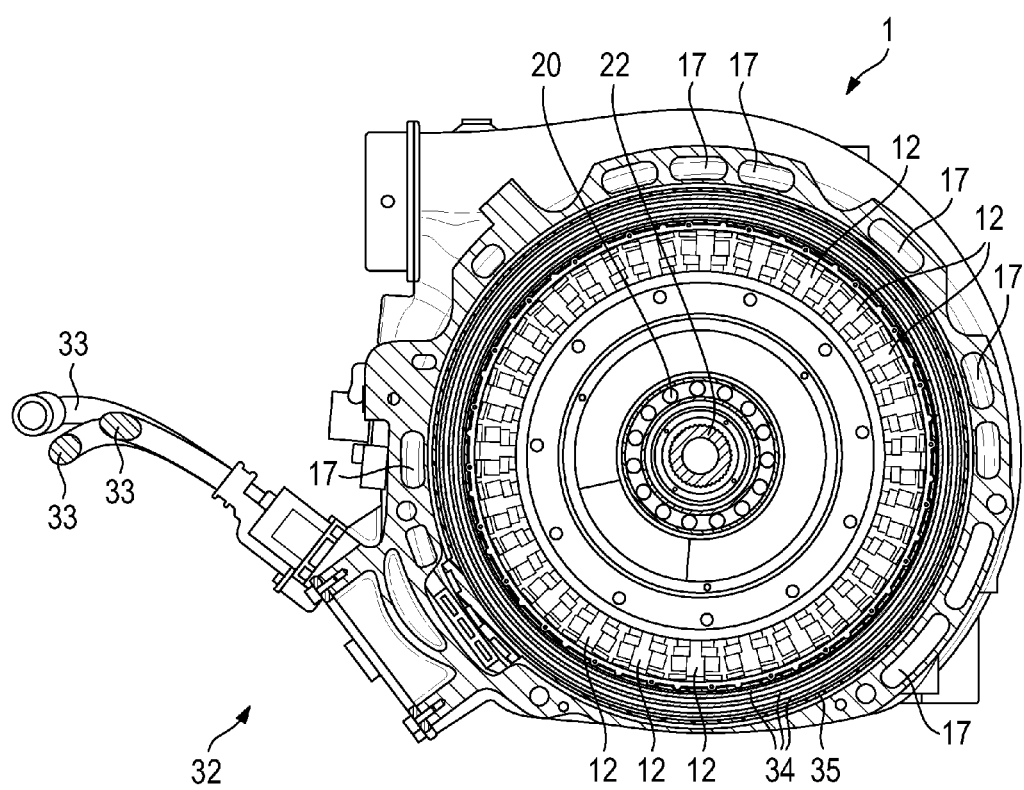
FIG. 4 is a section taken along line IV-IV in FIG. 1.

An electrical connection 32 of the electric machine 1 is illustrated in FIGS. 2-4. More particularly, electric cables 33 lead to the electric machine 1 for the three phases of the electric machine 1. Specifically, to conduct current to the coils of the stator 2, three connecting rings 34 are provided radially outside the winding heads 12. The connecting rings 34 are insulated from one another in a plastic part 35.

What is claimed is:

1. An electric machine for a hybrid or electric vehicle comprising a stator arranged within a rotor so that the rotor and the stator are concentric about an axis that extends in an axial direction, the rotor having a rotor carrier with a radially extending carrier section that extends substantially radially out from the axis and an axially extending carrier section connected to a radially outer region on the radially extending carrier section and extending substantially parallel to the axis, rotor plates mounted to a radially inner side of the axially extending carrier section and spaced axially from the radially extending carrier section and permanent magnets mounted to a radially inner side of the rotor plates and spaced axially from the radially extending carrier section, the stator having stator plates and wire windings, the wire windings forming winding heads that extend axially on both sides over the stator plates, and an impeller wheel connected to the radially extending carrier section of the rotor carrier and aligned axially with and facing the rotor plates and the permanent magnets, the impeller wheel further being arranged at a radial position radially inward of the axially extending carrier section and radially outward of the winding heads that are arranged on one axial side of the stator so that the impeller wheel does not project axially beyond the winding heads and does not project radially beyond the axially extending carrier section.

2. The electric machine of claim 1, wherein the rotor carrier is pot-shaped, the radially extending carrier section forming a floor region of the rotor carrier, and the axially extending carrier section forming a circumferential wall region of the rotor carrier.

3. The electric machine of claim 1, wherein the impeller wheel is arranged adjacent to the rotor plates and to the permanent magnets.

4. The electric machine of claim 1, wherein the impeller wheel forms a component of an open or closed cooling system.

5. The electric machine of claim 4, wherein the cooling system is open, incoming air is fed in the axial direction into a region between the rotor and stator via feed ducts in a housing of the electric machine, and outgoing air is discharged through openings in the rotor carrier and openings in the housing.

6. The electric machine of claim 1, further comprising a wheel connected to the rotor carrier, the wheel having a receptacle for connecting to a transmission input shaft in a rotationally fixed fashion.

7. The electric machine of claim 1, wherein the electric machine has an axially arranged intermediate shaft for connecting to a crankshaft of an internal combustion engine in a rotationally fixed fashion.

8. The electric machine of claim 7, wherein the electric machine has a clutch for connecting the intermediate shaft and wheel in a rotationally fixed fashion when the clutch is closed.

9. The electric machine of claim 8, wherein a pressure plate of the clutch is connected to the rotor carrier by means of screws.

10. The electric machine of claim 1, wherein the impeller wheel is configured to act as a radial blower.

11. The electric machine of claim 1, wherein the rotor plates are secured between the impeller wheel, inserted into the rotor carrier, and a section of the rotor carrier that faces away from the impeller wheel.

12. The electric machine of claim 1, wherein the rotor carrier and the impeller wheel define a unitary cast part.

13. The electric machine of claim 1, wherein the impeller wheel has holes on a circumference of the impeller wheel and air-blade-shaped elements that interact with said holes.

14. The electric machine of claim 1, wherein the impeller wheel has holes on a circumference of the impeller wheel, and the holes are shaped by a shaping process to form air-blade-shaped elements.

15. An electric machine for a hybrid or electric vehicle comprising a stator arranged within a rotor, the rotor having a rotor carrier, rotor plates and permanent magnets, the rotor carrier having a first, radially extending carrier section and a second, axially extending carrier section connected to one another, the second carrier section bearing the rotor plates and the permanent magnets, the stator having stator plates and wire windings, the wire windings forming winding heads that extend axially on both sides over the stator plates, and an impeller wheel connected to the rotor carrier, the impeller wheel being arranged between the winding heads arranged on an axial side of the stator and the second carrier section, an axially arranged intermediate shaft for connecting to a crankshaft of an internal combustion engine in a rotationally fixed fashion, and a clutch for connecting the intermediate shaft and wheel in a rotationally fixed fashion when the clutch is closed, the clutch having a pressure plate connected to the rotor carrier by screws, wherein the screws interact with and position the impeller wheel in the radial direction.

* * * * *